United States Patent [19]

Takahashi

[11] Patent Number: 5,506,766

[45] Date of Patent: Apr. 9, 1996

[54] 3-PHASE INPUT TYPE OF SWITCHING POWER CIRCUIT

[75] Inventor: Isao Takahashi, Nagaoka, Japan

[73] Assignee: TDK Corporation, Tokyo, Japan; a part interest

[21] Appl. No.: 399,630

[22] Filed: Mar. 7, 1995

[30] Foreign Application Priority Data

Mar. 9, 1994 [JP] Japan ...................................... 6-038482

[51] Int. Cl.⁶ .............................. H02M 7/06; H02M 5/42
[52] U.S. Cl. ............................................. 363/126; 363/89
[58] Field of Search ................................ 363/3–5, 16, 21, 363/36, 37, 81, 89, 92, 97, 126, 131, 171; 323/215, 229, 237, 251, 253, 282, 285, 300, 301, 320, 361

[56] References Cited

U.S. PATENT DOCUMENTS

| | | | |
|---|---|---|---|
| 4,667,282 | 5/1987 | Peterson | 363/126 |
| 4,684,818 | 8/1987 | Carlson | 363/126 |
| 4,807,106 | 2/1989 | Baker et al. | 363/126 |
| 4,808,866 | 2/1989 | Kawazoe et al. | 363/89 |

FOREIGN PATENT DOCUMENTS 3-207268   9/1991   Japan .

*Primary Examiner*—Matthew V. Nguyen
*Attorney, Agent, or Firm*—Oblon, Spivak, McClelland, Maier & Neustadt

[57] ABSTRACT

Each of the primary coils in the three transformers is assigned to one phase of the 3-phase input. A plurality of input diodes, with the primary coils, constitutes a 3-phase full wave rectifying circuit, which in turn consists of two Y-connection circuits. The main circuit of a switching element is connected between the common connecting points of the Y-connection circuits. An output rectifying circuit is connected to each of the secondary coils in the transformers to rectify, smooth and output the voltage generated on the secondary side due to the flyback effect. By using one main switching element, the input current waveform can be maintained as a sine wave, and variable adjustment of the output voltage can be performed, achieving a reduction in the capacity of the output side capacitor.

8 Claims, 8 Drawing Sheets

3-PHASE INPUT TYPE OF SWITCHING POWER CIRCUIT

BACKGROUND OF THE INVENTION

1. Field of the Invention

The present invention relates to a 3-phase input type of switching power circuit.

2. Discussion of Background

The best known type of switching power circuit in the prior art is a single phase input type of switching power circuit. In a single phase input type of switching power circuit, a single phase AC power is converted to DC power with a rectifying and smoothing circuit of the capacitor input type. Switching is performed and the converted power is output through a rectifying and smoothing circuit as DC power to be applied to a load. Although the single phase input type of switching power circuit has the advantage of simplicity, it presents various problems. For instance, since the electric current for charging that runs to the capacitor used in the input smoothing circuit is pulsed, the input power factor, at, for example, approximately 70%, is poor. Also, the higher harmonics component in the electric current is large and this causes a number of problems in the power system. Furthermore, a rush current runs through the input smoothing capacitor, sometimes causing a momentary reduction in the source voltage and an electrical breakdown in the rectifying circuit.

Known technology designed to solve the problems described above is disclosed in Japanese Unexamined Patent Publication No. 207268/1991. The technology disclosed in this publication employs a dither rectifying circuit. The dither rectifying circuit generates a composite signal in which a high frequency wave is superimposed on a sine wave by adding a high frequency dither signal to a non-linear current signal which runs to the input smoothing capacitor. The sine wave component is extracted from this composite signal using a low pass filter. With this, the power factor is significantly improved.

However, Japanese Unexamined Patent Publication No. 207268/ 1991 discloses only a single phase input type of switching power circuit and it does not disclose a 3-phase input type of switching power circuit.

To hypothesize a 3-phase input type of switching power circuit achieved with the technology for a single phase input type of switching power circuit disclosed in the prior art, it will be necessary to provide at least 3 switching elements for the sine wave input converter unit and another switching element for the DC-DC converter unit, for a total of four switching elements. In addition, 3 input reactors and one transformer for the converters are required. This means that the number of required components is high.

SUMMARY OF THE INVENTION

It is an object of the present invention to provide a 3-phase input type of switching power circuit in which the higher harmonics component, is extremely small and the power factor very high.

It is a further object of the present invention to provide a 3-phase input type of switching power circuit which requires only a small number of components.

It is yet a further object of the present invention to provide a 3-phase input type of switching power circuit in which no rush current occurs.

It is yet a further object of the present invention to provide a 3-phase input type of switching power circuit with a long service life.

It is yet a further object of the present invention to provide a 3-phase input type of switching power circuit which can perform high speed control with a high degree of efficiency.

It is yet a further object of the present invention to provide a 3-phase input type of switching power circuit in which the degree of energy transmission efficiency is high and the switching loss at the time of switched OFF is small.

In order to achieve the objects described above, the 3-phase input type of switching power circuit according to the present invention comprises three transformers, at least six input diodes, at least one switching element and an output rectifying circuit. Each of the three transformers includes primary coils and a secondary coil. Each of the primary coils in the three transformers is provided for one phase of the 3-phase input. The input diodes mentioned earlier, together with the primary coils, constitute a 3-phase full wave rectifying circuit which in turn consists of 2 Y-connection circuits. The switching element is a 3-terminal element and its main circuit is connected between common connection points of the Y-connection circuits. The output rectifying circuit is connected to each of the secondary coils in the transformers and while the switching element is in the ON state, the electromagnetic energy accumulates in the coil inductances of the aforementioned transformers and while the switching element is in the OFF state, the output rectifying circuit rectifies, smooths and outputs the electromagnetic energy.

Since the primary coils in each of the three transformers are allotted to one phase of the 3-phase input, the input diodes, along with the primary coils constitute a 3-phase full wave rectifying circuit, which in turn consists of 2 Y-connection circuits and the main circuit of the switching element is connected between the common connecting points (neutral points) of the Y-connection circuits, an electric current, which is directed by the input diodes, runs to the primary coils in the transformers while the switching element is in the ON state. The gradient (di/dt) of this electric current is in proportion to the phase voltage input.

When the switching element is turned off, the electromagnetic energy that has accumulated in the transformers while the switching element has been in the ON state is rectified and smoothed by the output rectifying circuit to be output as DC power. Since there is no energy transmission from the input side to the opposite side of the transformers while the switching element is in the OFF state, the secondary electric current running to the secondary coils in the transformers becomes reduced while charging the smoothing capacitor included in the output rectifying circuit. Also, the electric current running to the input diodes is blocked and, because of this, a high frequency electric current with a sawtooth waveform runs to the input. The peak of this high frequency electric current has a sine wave envelope. By extracting a power source frequency from this high frequency electric current using a general purpose low pass filter circuit, an input electric current with a sine wave is obtained. The sine wave input electric current thus obtained has approximately the same phase as that of the power source voltage. This raises the power factor to an extremely high level. Theoretically, the power factor will be at 100% with the higher harmonics component at 0%. In actuality, too, a power factor of 99.5% or higher is achieved with a higher harmonics component of 2% or lower.

Furthermore, while the switching element is in the ON state, the electromagnetic energy accumulates in the coil inductance of the aforementioned transformers and while the switching element is in the OFF state, it rectifies, smooths and outputs the electromagnetic energy. In other words, the switching power circuit according to the present invention employs the flyback converter system. Since no electric current runs to the input side while the switching element is in the OFF state in a flyback converter, rush current can be reduced to an extremely low level.

Moreover, in a balanced 3-phase circuit, if the waveforms of the voltage and the electric current are sine waves, the input power P has a DC value, as is well known. In this regard, the balanced 3-phase circuit differs greatly from single phase circuit, in which input power is expressed as a function whose frequency is double the source frequency. Because of this, in the 3-phase input type of switching power circuit according to the present invention, unlike a single phase input type of switching power circuit, only the high frequency component of the switching frequency appears in the output voltage. This achieves a reduction in the capacity value of the smoothing capacitor in the output rectifying circuit, high speed control and a longer service life. It also makes it possible to use a non-electrolytic capacitor such as a film capacitor as the smoothing capacitor, further lengthening the service life compared to a smoothing capacitor employing an electrolytic capacitor.

In addition, the present invention takes a structure in which the main circuit of the switching element is connected to the common connecting points (neutral points) of the Y-connection circuits that are constituted with the primary coils in the transformers, requiring basically only one switching element. This achieves a significant reduction in the number of parts.

The transformers are preferably constituted of transformers with gaps in the cores. This will make it possible to connect the smoothing capacitor to the secondary sides of the transformers and to effect insulation between the input and the output with a small, high frequency transformer.

In one preferred embodiment, each of the three aforementioned transformers is provided with two primary coils with one of them constituting one of the aforementioned Y-connection circuits and the other constituting the other of the Y-connection circuits. In another preferred embodiment, the two primary coils mentioned earlier are constituted by providing a center tap in one coil which is wound continuously.

These two primary coils may be wound independently of each other as in another embodiment.

In yet another embodiment, the aforementioned input diodes constitute two diode Y-connection circuits. In these two diode Y-connection circuits, the directions of the diodes facing the common connecting point are opposite of each other and the two diode Y-connection circuits are connected in parallel at another end that is different from the end that constitutes the common connecting point. Each of the primary coils is connected to the parallel connecting points of the two diode Y-connection circuits at one end and the switching element may be connected between the common connecting points of the two diode Y-connection circuits.

The 3-phase input type of switching power circuit according to the present invention includes, under normal circumstances, a control circuit that detects the voltage output from the output rectifying circuit to control the switching element.

Yet another preferred embodiment of the present invention includes a snubber circuit. This snubber circuit transmits at least the energy accumulated in the leakage inductances of the transformers to the load through a 0-voltage switching operation. With this snubber circuit, at least the energy accumulated in the leakage inductances of the transformers is regenerated to the load, improving the efficiency with which the energy is transmitted and, at the same time, reducing the switching loss when switching off in a 0-voltage switching operation.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
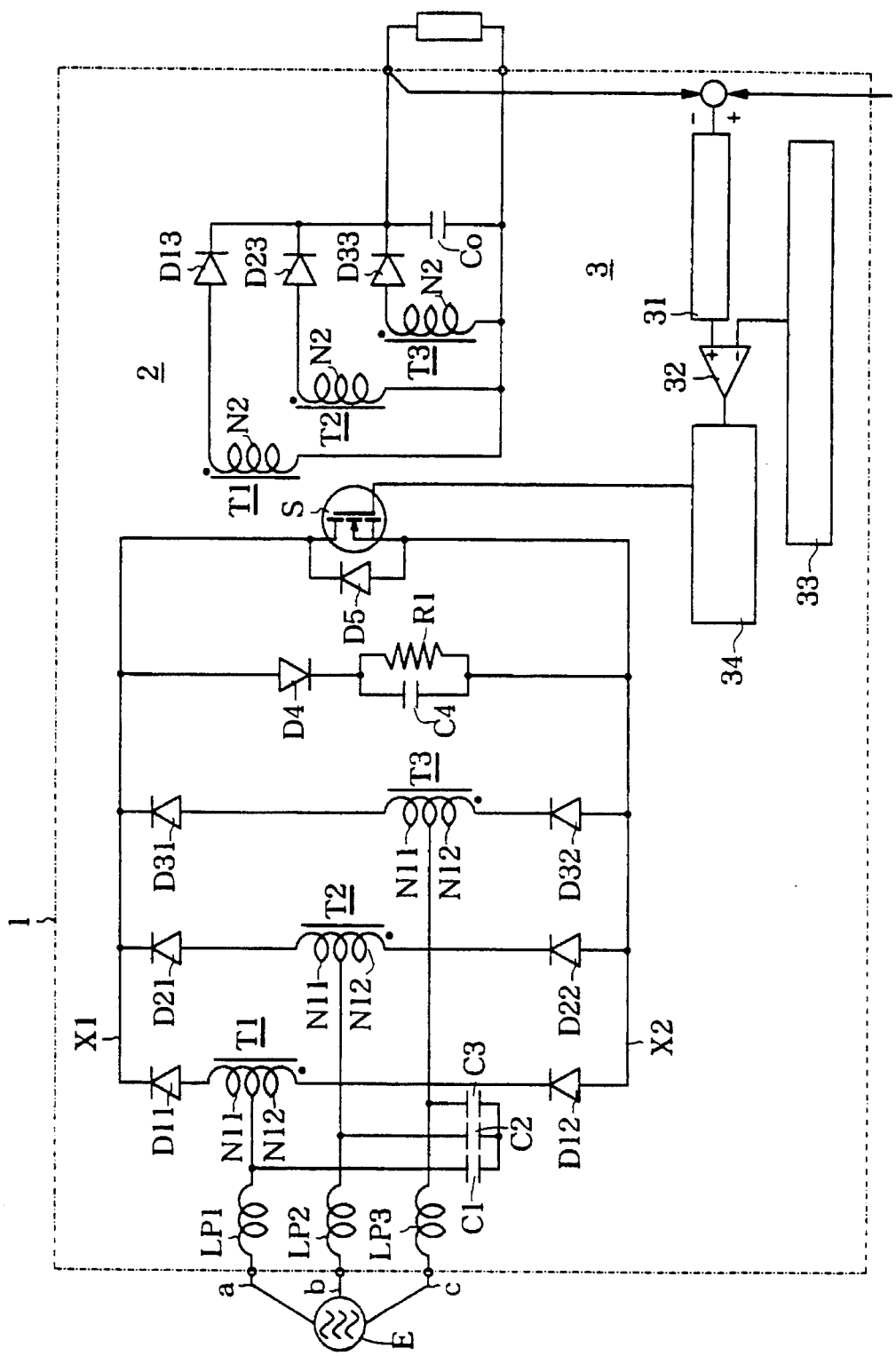
FIG. 1 is an electrical circuit diagram of a 3-phase input type of switching power circuit according to the present invention.
Figure 2:
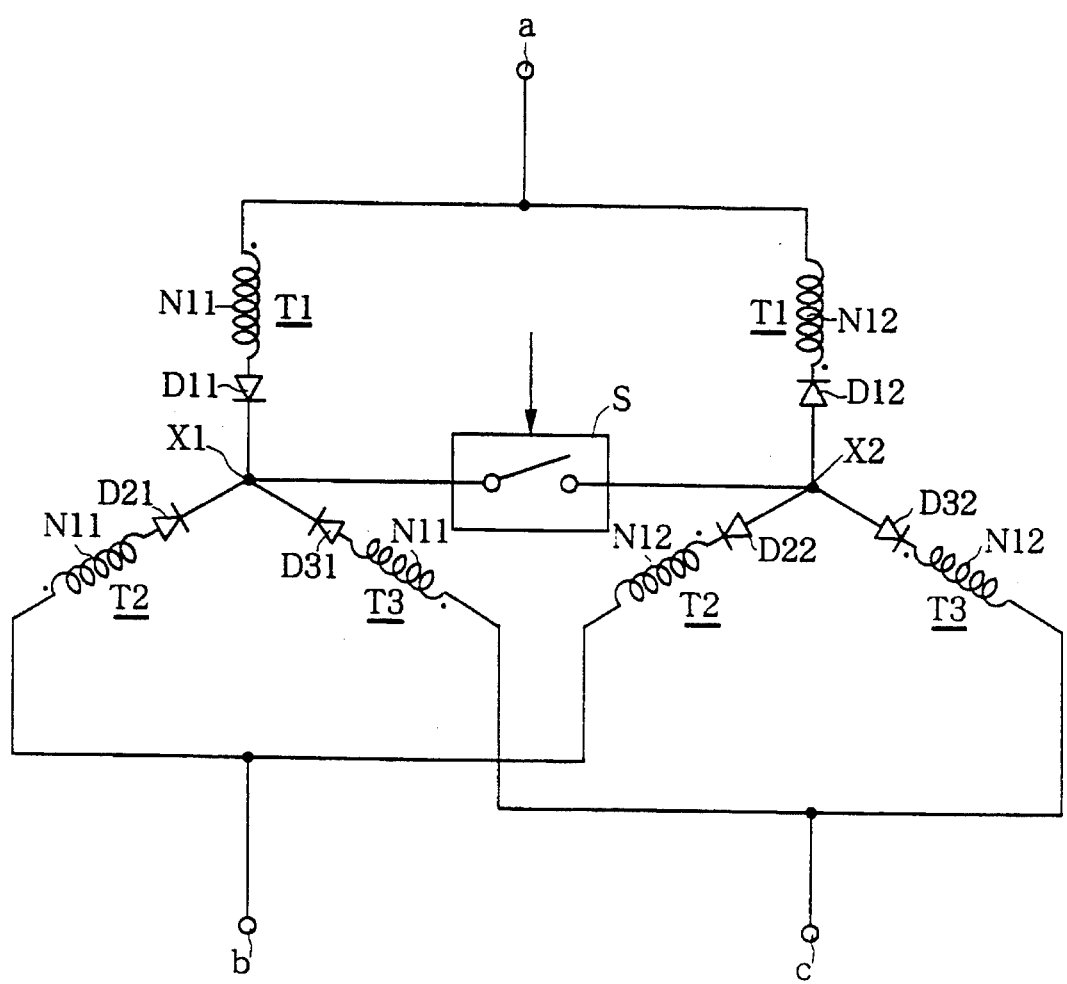
FIG. 2 is an electrical circuit diagram which illustrates, in a simplified manner, the connection relationship between the transformers and the switching element in the 3-phase input type of switching power circuit shown in FIG. 1.

In reference to FIGS. 1 and 2, the portion enclosed with the enclosure 1 in FIG. 1 indicates the 3-phase input type of switching power circuit according to the present invention. The 3-phase input type of switching power circuit 1 includes three transformers T1 to T3, at least 6 input diodes (D11, D12) to (D31, D32), at least one switching element S and an output rectifying circuit 2.

Each of the 3 transformers T1 to T3 includes primary coils N11 and N12 and a secondary coil N2. Each set of the primary coils N11 and N12 in the three transformers T1 to T3 is provided for one separate phase (a), (b) or (c), of the 3-phase input. Specifically, the primary coils N11 and N12 in the transformer T1 are assigned to phase (a), the primary coils N11 and N12 in the transformer T2 are assigned to phase (b) and the primary coils N11 and N12 in the transformer T3 are assigned to phase (c). The primary coil N11 of the transformer T1, the primary coil N11 in the transformer T2 and the primary coil N11 in the transformer T3 are connected with one another so that they will constitute a Y-connection circuit. Likewise, the primary coil N12 of the transformer T1, the primary coil N12 in the transformer T2 and the primary coil N12 in the transformer T3 are connected with one another so that they will constitute a Y-connection circuit.

The input diodes (D11, D12) to (D31, D32), with the primary coils N11 and N12, constitute a 3-phase full wave rectifying circuit which in turn consists of 2 Y-connection circuits. In the figures, the input diodes D11 and D12 are connected to the primary coils N11 and N12 respectively of the transformer T1. The input diodes D11 and D12 are positioned so as to send electric current bi-directionally to the primary coil, which consist of the primary coils N11 and N12, of the transformer T1 and to send electric current uni-directionally to the switching element (S). The input diodes D21, D22 are connected to the primary coils N11 and N12 respectively of the transformer T2 and are positioned so as to send electric current bi-directionally to the primary coil, which consist of primary coils N11 and N12, of the transformer T2 and to send current uni-directionally to the switching element (S). The input diodes D31, D32 are connected to the primary coils N11 and N12 respectively of the transformer T3 and are positioned so as to send electric current bi-directionally to the primary coil, which consist of primary coils N11 and N12, of the transformer T3 and to send current electric uni-directionally to the switching element (S).

The main circuit of the switching element (S) is connected to common connecting points X1 and X2 (neutral points) of the Y-connection circuits. The switching element (S) can be constituted with a 3-terminal element such as a transistor, an FET, an IGBT or an MCT. The IGBT or the MCT will be ideal for transforming high electric current to high frequency. The minimum requirement for the number of switching elements (S) is one. However, a plurality of switching elements may be used, depending upon the electric current capacity or the voltage.

The output rectifying circuit 2 is connected to each of the secondary coils N2 in the transformers T1 to T3 and while the switching element is in the ON state, the electromagnetic energy accumulates in the coil inductance of the aforementioned transformers and while the switching element is in the OFF state, it rectifies, smooths and outputs the electromagnetic energy. The output rectifying circuit 2 is provided with rectifying diodes D13, D23 and D33 connected to the secondary coils N2 respectively and a smoothing capacitor Co, to which charging effect is commonly applied by the rectifying diodes D13, D23 and D33.

As has been explained so far, since each set of the primary coils N11 and N12 in the three transformers T1 to T3 is assigned to one phase a, b, c of the 3-phase input, the input diodes (D11, D12) to (D31, D32) along with the primary coils N11 and N12, constitute a 3-phase full wave rectifying circuit, which in turn consists of 2 Y-connection circuits and the main circuit of the switching element S is connected between the common connecting points X1 and X2 of the Y-connection circuits. An electric current which is directed by the input diodes (D11, D12) to (D31, D32), runs to the primary coils N11 and N12 in the transformers T1 to T3 while the switching element in the ON state. Since the gradient (di/dt) of this electric current is in proportion to the input phase voltage, the electric current has a sawtooth wave form. Because of this, the filtered electric current has a sine wave in proportion to the input voltage.

Next, when the switching element S is turned off, the electric current running to the input diodes (D11, D12) to (D31, D32) is cut off. Also, while the switching element S is in the ON state, the electromagnetic energy accumulates in the coil inductance of the transformers T1 to T3 and while the switching element S is in the OFF state, it rectifies, smooths and outputs the electromagnetic energy. Since there is no energy transmission from the input side to the output side of the transformers T1 to T3 while the switching element S is in an OFF state, the secondary electric current running to the secondary coils N2 of transformers T1 to T3 becomes reduced while charging the smoothing capacitor Co, which is included in the output rectifying circuit 2. Because of this, a high frequency electric current with a sawtooth waveform runs to the input. The peak of this high frequency electric current has a sine wave envelope. By extracting a power source frequency from this high frequency electric current using a low pass filter circuit, an input electric current with a sine wave is obtained. The sine wave input electric current thus obtained has approximately the same phase as that of the power source voltage. This raises the power factor to an extremely high level. Theoretically, the power factor will be at 100% with the higher harmonics component at 0%. In actuality, too, it is possible to secure a total power factor of 99. 5% or higher while the higher harmonics component can be reduced to 2% or lower.

Furthermore, in the present invention, when the switching element is in the OFF state, the output rectifying circuit 2 rectifies, smooths and outputs the electromagnetic energy that has accumulated in the transformers T1 to T3 while the switching element S has been in the ON state. In other words, the switching power circuit according to the present invention employs the flyback converter system. In the flyback converter, no electric current runs to the input side while the switching element is in the OFF state and thus, the rush current can be reduced to an extremely low level.

Moreover, as is well known, in a 3-phase circuit, when the power factor is at 100%, the input power P is expressed as:

$$P = \sqrt{3} \; V_s \cdot I_s.$$

In this equation, Vs represents the line voltage effective value and Is represents the line current effective value. As explained earlier, in a 3-phase circuit, the input power P has a DC value. In this regard, a 3-phase circuit differs greatly from a single phase power circuit, for which the input power is expressed as a function whose frequency is double the source frequency. Because of this, in the switching power circuit according to the present invention, unlike a single phase input type of switching power supply, only the high frequency component of the switched frequency appears in the output voltage. This achieves a reduction in the capacity value of the smoothing capacitor Co constituting the output rectifying circuit 2, thereby achieving high speed control and longer service life. It also makes it possible to use a non-electrolytic capacitor such as a film capacitor for the smoothing capacitor Co, further lengthening the service life compared to a smoothing capacitor employing an electrolytic capacitor.

In addition, the present invention takes the structure in which the main circuit of the switching element S is connected to the common connecting points X1 and X2 of the Y-connection circuits that are constituted with the primary coils N11 and N12 and the input diodes (D11, D12) to (D31, D32), requiring basically only one switching element. This achieves a great reduction in the number of parts.

The transformers T1 to T3 are preferably constituted with transformers with gaps in the cores. With such transformers T1 to T3 with gaps, it is possible to use the primary coils N11 and N12 for reactors. This will make it possible to connect the smoothing capacitor Co to the secondary sides of the transformers T1 to T3 and to effect insulation between the input and the output with a small, high frequency transformer.

In the 3-phase input type of switching power circuit shown in FIGS. 1 and 2, each of the transformers T1 to T3 is provided with two primary coils N11 and N12 and these primary coils N11 and N12 constitute 2 Y-connection circuits with the input diodes (D11, D12) to (D31, D32). The switching element S is connected between the two common connection points X1 and X2, which are constituted by the 2 Y-connection circuits. More specifically, the two primary coils N11 and N12 are constituted by providing a center tap in one coil which is continuously wound. Each center tap is led to a 3-phase power source E. It is preferable to provide each of the transformers T1 to T3 with a coil structure and a magnetic circuit which are, as much as possible, identical, to achieve balance among them.

In addition, the 3-phase input type of switching power circuit shown in FIGS. 1 and 2 includes a control circuit 3, which detects the voltage output from the output rectifying circuit 2 to control the switching element S. The control circuit 3 performs duty control for the switching element S, based upon the detected output voltage value so that the output voltage will be stable. More specifically, the control circuit 3 compares the detected output voltage against the instructed value, inputs the difference value obtained by comparing to a comparator 32 via a proportional integral circuit 31, and then compares the signal output from the proportional integral circuit 31 with a triangular wave supplied by a triangular wave oscillator 33 at the comparator 32. Based upon the compared output, the comparator 32 controls the duty ratio of the switching element S via a drive circuit 34 in the direction in which the output voltage is stabilized. When the duty ratio is changed, the level of the input electric current also changes, so that a level of power that corresponds to the load can be input. In such a case, only the output voltage signal is fed back and the input electric current automatically becomes a sine wave, eliminating the necessity for detection of the input electric current. This achieves stabilization of the output voltage by transforming the input electric current to a sine wave with a simple circuit structure. The input electric current can also be controlled by controlling the frequency instead of the duty ratio.

In FIG. 1, reference code E indicates a 3-phase power source, reference codes LP1 to LP3 indicate impedances in the power source or line reactors, reference codes C1 to C4 indicate capacitors, reference codes D4 and D5 indicate diodes and reference code R1 indicates a resistor. The diode D4, the capacitor C4, and the resistor R1 constitute a clamping circuit. This clamping circuit inhibits the surge voltages generated at both ends of the switching element S.

Figure 3:
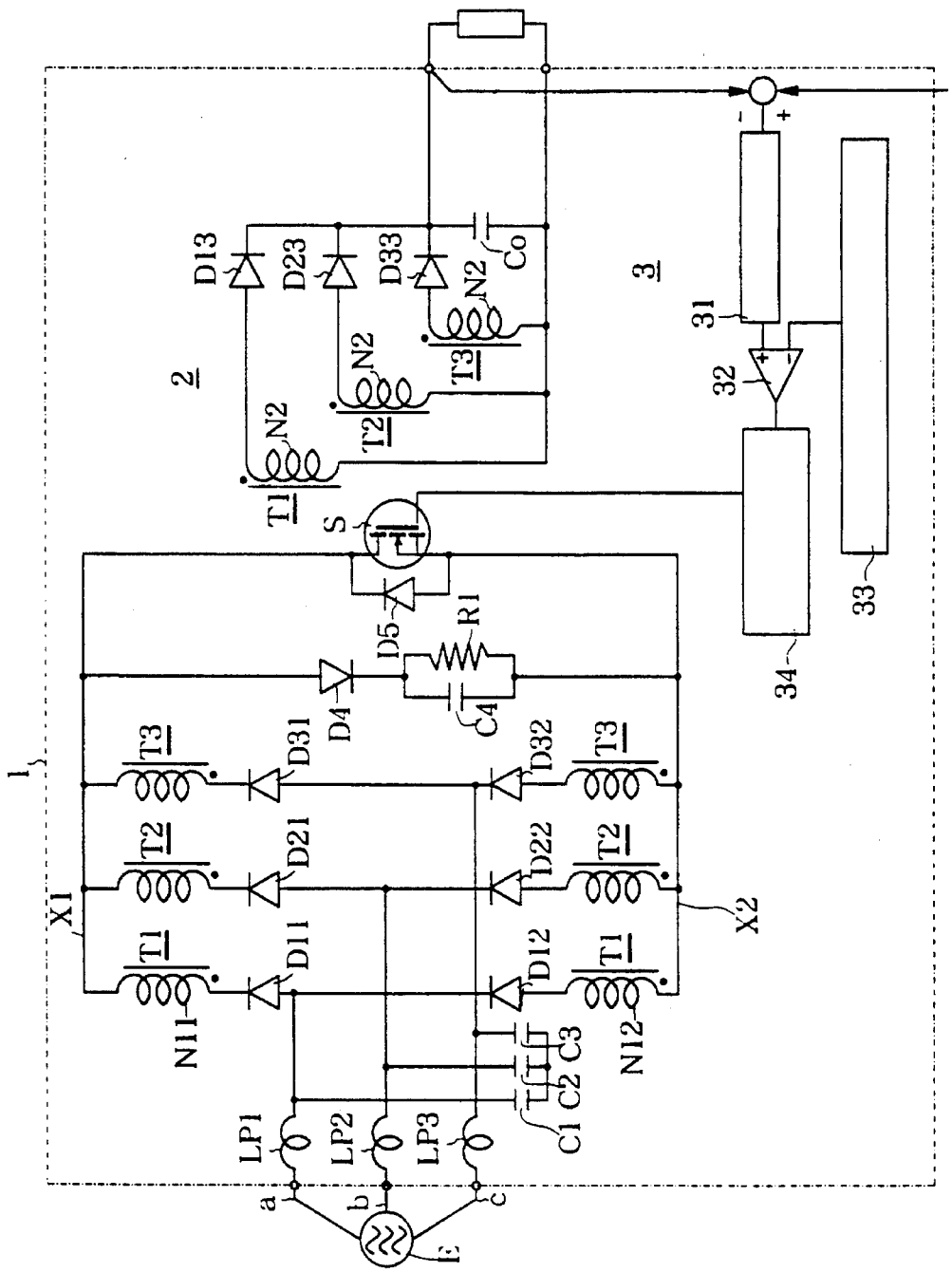
FIG. 3 is an electrical circuit diagram showing another embodiment of the 3-phase input type of switching power circuit according to the present invention.
Figure 4:
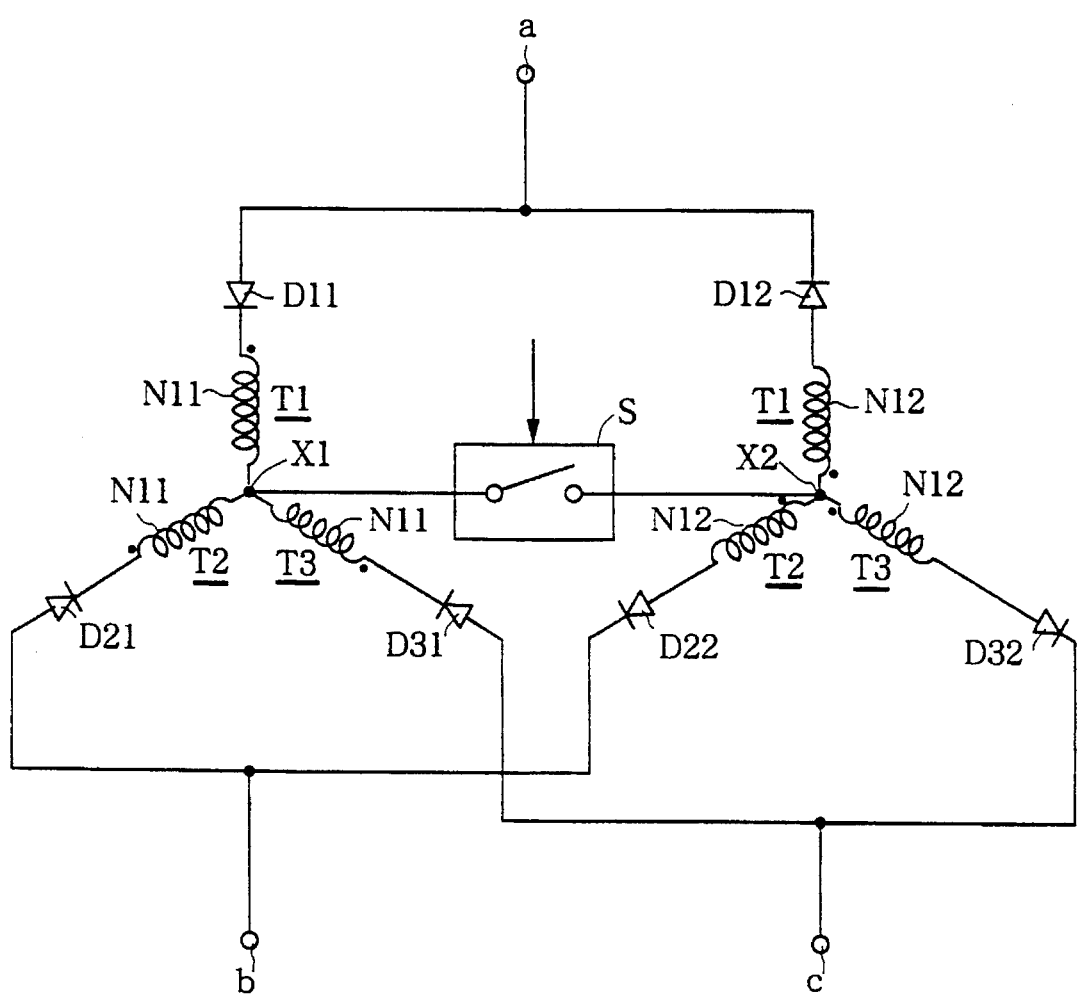
FIG. 4 is an electrical circuit diagram which illustrates, in a simplified manner, the connection relationship between the transformers and the switching element in the 3-phase input type of switching power circuit shown in FIG. 3.

Next, explanation is given in regard to the 3-phase input type of switching power circuit shown in FIGS. 3 and 4. In these FIGS., the same reference codes are assigned to components identical to those shown in FIGS. 1 and 2 and their explanation is omitted. In this embodiment, the two primary coils N11 and N12 provided in each of the transformers T1 to T3 are wound independently of each other. Comparison with the 3-phase input type of switching power circuit shown in FIGS. 1 and 2 reveals that this 3-phase input type of switching power circuit differs from the first one only in the structure of the primary coils N11 and N12 and in the position of the input diodes (D11, D12) to (D31, D32).

Figure 5:
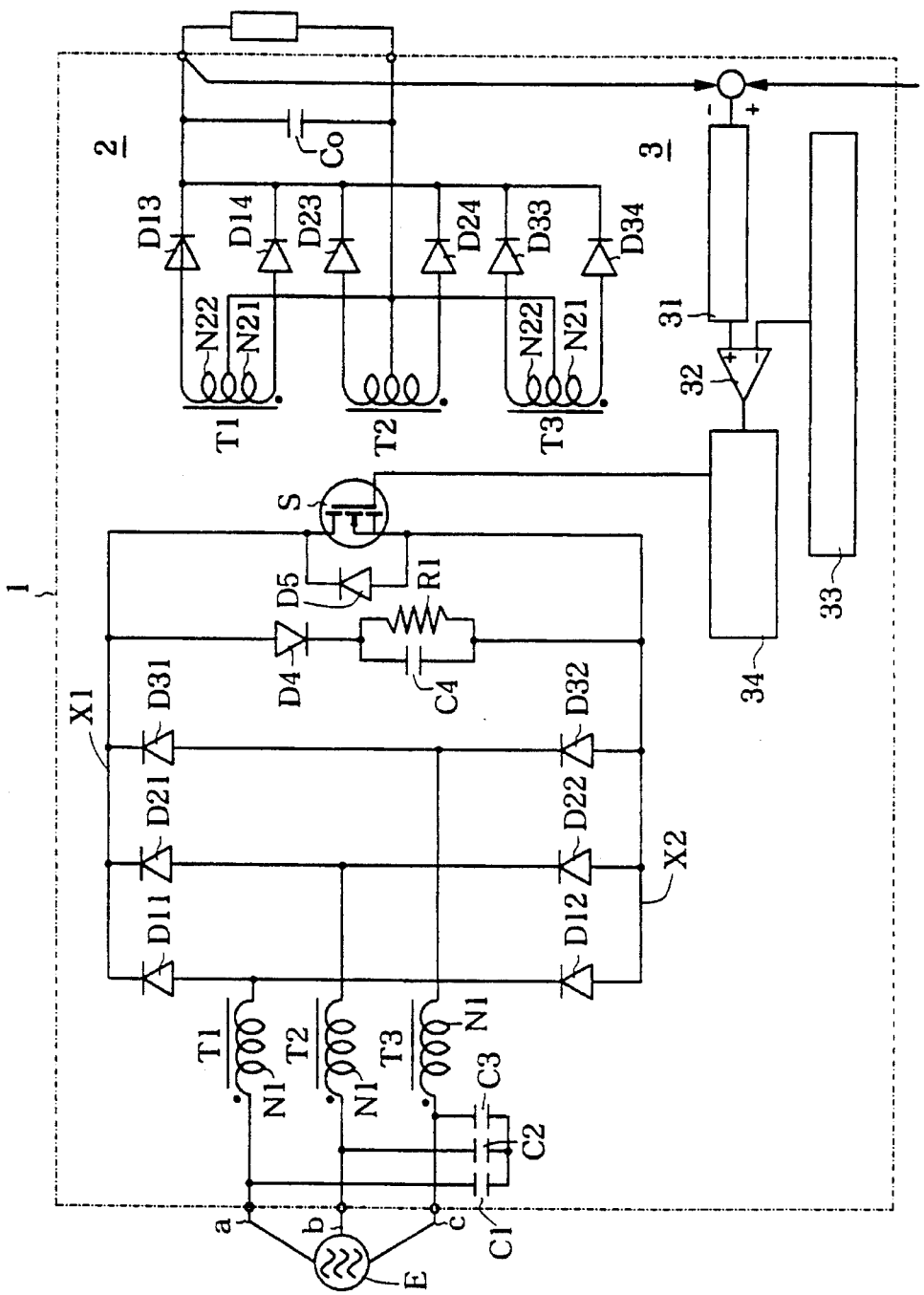
FIG. 5 is an electrical circuit diagram showing another embodiment of the 3-phase input type of switching power circuit according to the present invention.
Figure 6:
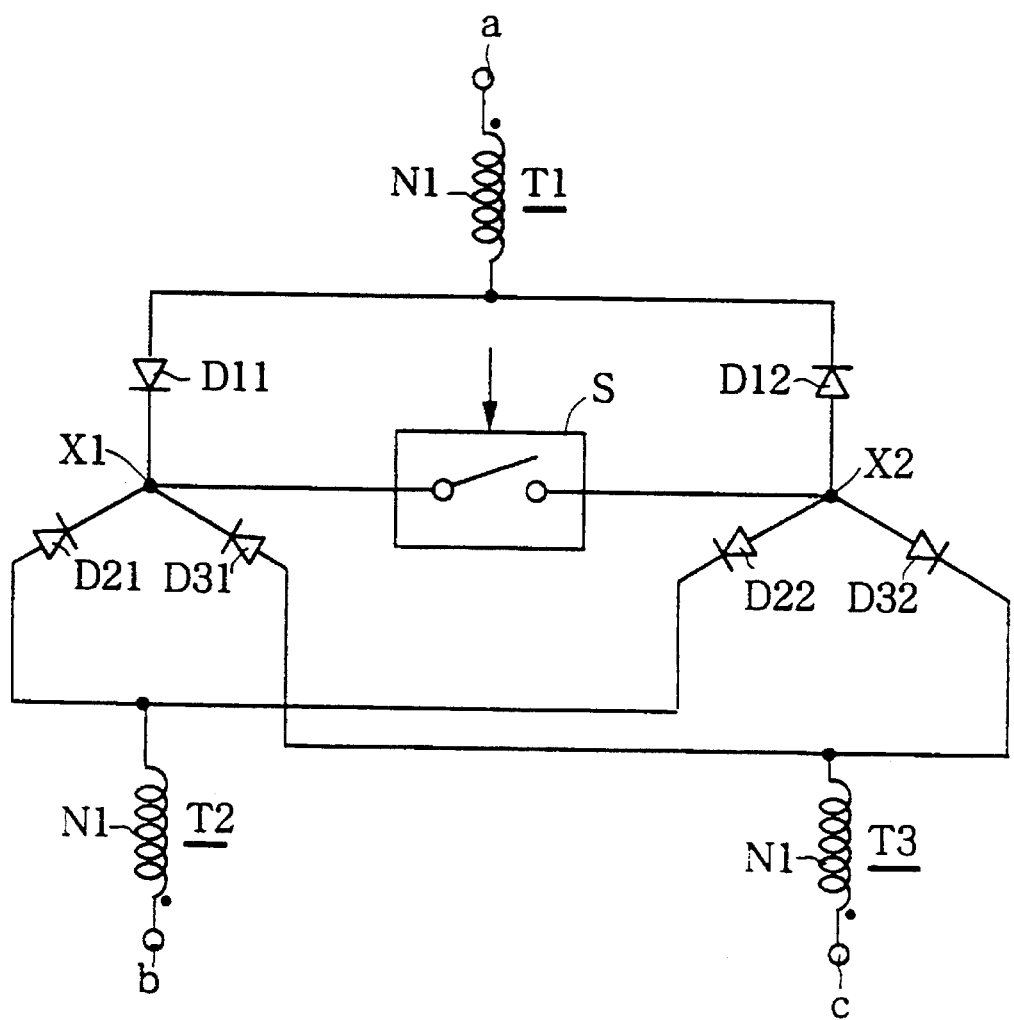
FIG. 6 is an electrical circuit diagram which illustrates, in a simplified manner, the connection relationship between the transformers and the switching element in the 3-phase input type of switching power circuit shown in FIG. 5.

Now, explanation is given in regard to the embodiment of the 3-phase input type of switching power circuit according to the present invention shown in FIGS. 5 and 6. In these figures, too, the same reference codes are assigned to components identical to those shown in FIGS. 1 and 2 and their explanation is omitted. In this embodiment, the input diodes (D11, D12) to (D31, D32) constitute two diode Y-connection circuits. In these two diode Y-connection circuits, the directions of the diodes facing the common connecting points X1 and X2 are the opposite of each other and the two diode Y-connection circuits are connected in parallel at another end that is different from the end that constitutes the common connecting points X1 and X2. One end of each of the primary coils N11 and N12 is connected to a parallel connecting point of the two diode Y-connection circuits. The switching element S is connected between the common connecting points X1 and X2 of the two Y-connection circuits. Each of the transformers T1 to T3 is provided with secondary coils N21, N22 with a center tap so that full wave rectification can be performed for the flyback voltages, that are bi-directionally generated at the secondary coils N21, N22, with the diodes (D11, D12) to (D31, D32).

Although detailed explanation is not given, the embodiments shown in FIGS. 3 to 6 also achieve advantages similar to those achieved by the embodiment shown in FIGS. 1 and 2.

Figure 7:
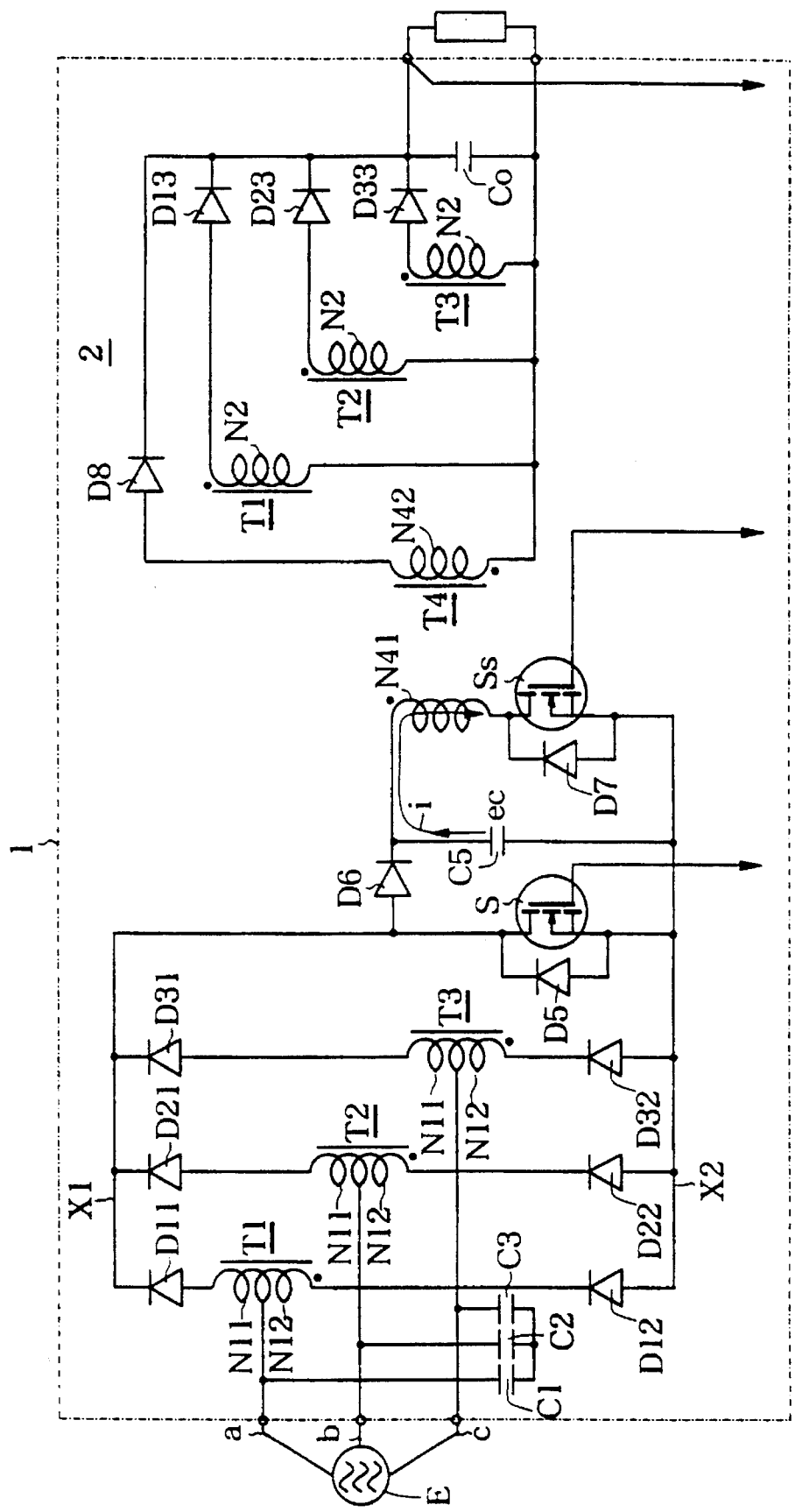
FIG. 7 is an electrical circuit diagram showing another embodiment of the 3-phase input type of switching power circuit according to the present invention.

Now, explanation is given of the embodiment of the 3-phase input type of switching power circuit according to the present invention shown in FIG. 7. In this figure, too, the same reference codes are assigned to components identical to those shown in FIGS. 1 to 6 and their explanation is omitted. Although the control system shown in FIGS. 1, 3 and 5 is not shown in FIG. 7, it is obvious that the embodiment shown in FIG. 7 is also provided with such a control system.

The characteristic feature of the 3-phase input type of switching power circuit shown in FIG. 7 is a snubber circuit 4. The inductance of the embodiments shown in FIGS. 1 to 6, which are not provided with a snubber circuit 4, is extremely small when the power circuit has a large capacity of 5 KW or more, since the input power P is in inverse proportion to the inductances of the transformers T1 to T3. Because of this, as mentioned earlier, the transformers T1 to T3 require very large gaps, increasing the leakage inductance and reducing the efficiency with which the electric power is transmitted. Also, since the electric current running to the switching element S has a sawtooth waveform, there is great switching loss when the switching element S is turned off. The snubber circuit 4 shown in FIG. 7 is provided in order to solve these problems.

The snubber circuit 4 includes a diode 6, a capacitor C5, a switching element Ss and a transformer T4. The anode of the diode D6 is connected to the drain of the switching element S and its cathode is connected to one end of the primary coil N41 of the transformer T4. The other end of the primary coils N41 of the transformer T4 is connected to the drain of the switching element Ss and the source of the switching element Ss is connected to the source of the switching element S. Both ends of the capacitor C5 are connected between the cathode of the diode D6 and the source of the switching element Ss. A diode D7 connected between the drain and the source of the switching element Ss shows a body-drain diode of the switching element Ss. One end of the secondary coil N42 of the transformer T4 is connected to the anode of a diode D8, which is included in an output circuit 2, and the cathode of the diode D8 is connected commonly with the cathodes of the diodes D13 to D33, which are connected to the coils N2 of the transformers T1 to T3. The diode D8 is directed in such a manner that it is positioned in the forward direction relative to the flyback voltage generated in the transformer T4.

In the 3-phase input type of switching power circuit according to the present invention which is provided with the snubber circuit 4 described above, when the main switching element S is turned off, the energy accumulated in the circuit wiring and the leakage inductances of the transformers T1 to T3 charges the capacitor C5 via the diode D6. At this point, if the initial value of the voltage of the capacitor C5 is 0, a 0-voltage switching operation can be performed. The maximum value of the terminal voltage of the capacitor C5 and its rising time are determined by the electric current running to the transformers T1 to T3 the leakage inductances of the transformers T1 to T3 and the capacity of the capacitor C5.

Figure 8:
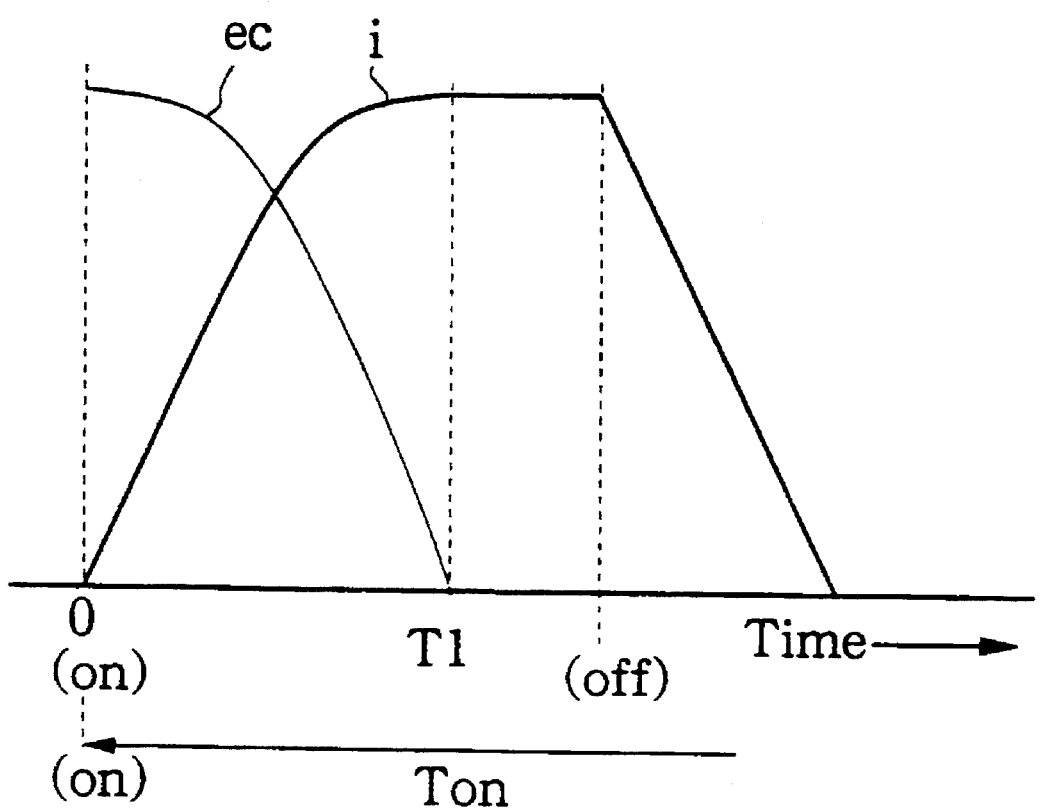
FIG. 8 illustrates the operation of the snubber circuit included in the 3-phase input type of switching power circuit according to the present invention.

Next, when the switching element Ss in the snubber circuit 4 is turned on at the same time as the main switching element S is turned on, as shown in FIG. 8, an LC resonance circuit is constituted with the capacitor C5 and the primary coil N41 of the transformer T4 and the charge accumulated in the capacitor C5 is discharged via a circuit loop which includes the primary coil N41 of the transformer T4, the switching element Ss and the capacitor C5. The electric current (i) which is generated by the discharge is part of the sine wave shown in FIG. 8 (0 to π/2). As a result of the discharge described above, the terminal voltage (ec) of the capacitor C5 is gradually reduced and reaches 0 at the time point T1.

Following the time point T1, the electric current (i) runs through the diode D6, the primary coil N41 of the transformer T4, the switching element Ss and the body-drain diode D5 of the switching element S. Since the primary coil N41 is shorted by the switching element Ss, the diode D5 and the diode D6 in this circuit loop, $L \cdot (di/dt) = 0$ and the electric current (i) becomes constant. The time over which the electric current (i) is constant may be a very short period, including 0.

When the switching element Ss, which is included in the snubber circuit 4, is turned off at the time point T1, which is when the terminal voltage (ec) of the capacitor C5 reaches 0, or after the time point T1 (with the timing shown in FIG. 8), the energy accumulated in the transformer T4 is transmitted to the load via the primary coil N41, the secondary coil N42 and the diode DS, due to the flyback effect. The electric current (i) gradually decreases, as shown in FIG. 8, and eventually reaches 0. Because of this regenerative effect, the energy accumulated in the circuit wiring, the leakage inductances and the like of the transformers T1 to T3 is transmitted to the load side, improving the efficiency with which the energy is transmitted compared to the embodiments shown in FIGS. 1 to 6. Furthermore, since a 0-voltage switching operation is performed, the switching loss when tile switching element is turned off, is reduced.

In order to ensure that the 0-voltage switching operation described above is performed, the value selected for the time point T1 at which the terminal voltage (ec) of the capacitor C5 reaches 0, must not exceed the minimum length of time Ton during which the switching element S is on. When the inductance of the primary coil N41 of the transformer T4 is assigned (L) and the capacity value of the capacitor C5 is assigned (C5), the time point T1 is expressed as;

$$T1 = (\pi/2) \cdot (L \cdot C5)^{1/2}$$

Therefore, by setting the inductance (L) of the primary coil N41 of the transformer T4, and the capacity value (C5) of the capacitor C5, at values such that the time point T1 is set at a value which satisfies T1<Ton, it is possible to ensure that the 0-voltage switching operation is performed. For example, when the minimum length of time Ton of the switching element S is set at a few μS, (C5)=0.1 μF and (L)=100 μF. Note that when the pulse width caused by switched is small, the electric current is small, with reduced switching loss and it is not always necessary, therefore, to turn off the switching element Ss when (ec)=0.

While the invention has been particularly shown and described with reference to preferred embodiments thereof, it will be understood by those skilled in the art that various changes in form and detail may be made therein without departing from the spirit, scope and teaching of the invention.

What is claimed is:

1. A 3-phase input type of switching power circuit comprising:

three transformers, at least six input diodes, at least one switching element and an output rectifying circuit, wherein;

each of said three transformers includes primary coils and a secondary coil, and said primary coils in each of said three transformers are provided for one phase of the 3-phase input, said input diodes, along with said primary coils constitute a 3-phase full wave rectifying circuit, said 3-phase full wave rectifying circuit comprised of 2 Y-connection circuits, said switching element is a 3-terminal element with its main circuit being connected between common connection points of said Y-connection circuits, and said output rectifying circuit is connected to each of said secondary coils in said transformers and while said switching element is in an OFF state, said output rectifying circuit rectifies, smooths and outputs the electromagnetic energy that has accumulated in the coil inductances of the secondary coils in said transformers while said switching element has been in an ON state.

2. A 3-phase input type of switching power circuit according to claim 1 wherein; said three transformers are transformers provided with air gaps in their cores.

3. A 3-phase input type of switching power circuit according to claim 1 wherein; each of said three transformers is provided with two of said primary coils with one of said two primary coils constituting one of said Y-connection circuits and the other of said two primary coils constituting the other of said Y-connection circuits.

4. A 3-phase input type of switching power circuit according to claim 3 wherein; said two primary coils are constituted by providing a center tap in one coil that is wound continuously.

5. A 3-phase input type of switching power circuit according to claim 3 wherein; said two primary coils are wound independently of each other.

6. A 3-phase input type of switching power circuit according to claim 1 wherein; said input diodes constitute two diode Y-connection circuits in which the directions of said diodes relative to said common connecting points are opposite each other and said two diode Y-connection circuits are connected in parallel at another end that is different from one end that constitutes the common connecting points, one end of each of said primary coils is connected to a parallel connecting point of said two diode Y-connection circuits, and said switching element is connected between said common connecting points of said two Y-connection circuits.

7. A 3-phase input type of switching power circuit according to claim 1 including; a control circuit for detecting an output voltage outputted from said output rectifying circuit to control said switching element.

8. A 3-phase input type of switching power circuit according to any of claims 1 through 7 including;

a snubber circuit that transmits at least the energy accumulated in the leak inductances of said transformers to a load by a 0-voltage switching operation.

* * * * *